United States Patent [19]

Brautigam

[11] Patent Number: 4,565,407

[45] Date of Patent: Jan. 21, 1986

[54] SEAT HOLDUP MECHANISM

[75] Inventor: Peter F. Brautigam, Kewaskum, Wis.

[73] Assignee: Deere & Company, Moline, Ill.

[21] Appl. No.: 559,661

[22] Filed: Dec. 9, 1983

[51] Int. Cl.[4] .............................................. A47C 1/02
[52] U.S. Cl. .................................. 297/335; 297/344; 297/355
[58] Field of Search ............... 297/335, 336, 344, 331, 297/334, 311, 326, 328, 355; 292/338, 271, 254; 5/74 R, 77; 108/82

[56] References Cited

U.S. PATENT DOCUMENTS

| 1,899,880 | 2/1933 | Paul | 297/356 |
| 2,284,003 | 5/1942 | Luppert | 108/82 X |
| 2,546,834 | 3/1951 | Pfau | 297/377 X |
| 4,364,602 | 12/1982 | Rigazio | 297/335 X |
| 4,408,798 | 10/1983 | Mizushima et al. | 297/326 |

FOREIGN PATENT DOCUMENTS

| 146712 | 8/1954 | Sweden | 5/77 |
| 0158425 | 2/1921 | United Kingdom | 297/335 |
| 596063 | 12/1947 | United Kingdom | 297/326 |

Primary Examiner—William E. Lyddane
Assistant Examiner—José V. Chen

[57] ABSTRACT

A vehicle seat is mounted on a platform that is pivotally mounted to the vehicle frame for movement between a lowered, operating position and a fully raised, non-use position. A holdup mechanism is coupled between the underside of the platform and the frame and includes a prop link having an end received in a guide slot provided in a bracket secured to the platform. The guide slot defines a plurality of notches therealong and a spring urges the prop link so its end will automatically enter an adjacent notch upon releasing the platform during lifting or lowering the platform to or from its fully raised position. A release mechanism is provided for moving the prop link against the action of the spring so as to permit the platform to be lowered.

3 Claims, 2 Drawing Figures

SEAT HOLDUP MECHANISM

BACKGROUND OF THE INVENTION

The present invention relates to vehicle seats and more particularly relates to devices for selectively holding a seat in an upwardly pivoted, non-use position.

The space beneath the seat of a vehicle such as a tractor or the like is often occupied by components which require servicing from time-to-time. In order for these components to be readily accessible, it is known to mount the vehicle seat on a platform which is mounted for pivoting upward to a non-use position. It is important for a person servicing these components to have both hands free and this is ensured by the provision of a mechanism for selectively holding the seat in its non-use position. U.S. Pat. No. 4,025,108 discloses a vertically pivotable seat assembly and prop or holdup device therefor.

The patented structure has the disadvantage of having the holdup device exposed and of requiring the frame supporting the seat structure to have portions located almost at the level of the top of the seat cushion when the seat is in its operating position. Also, the holdup device holds the seat only in its completely raised position. Thus, if the hands of a person raising or lowering the seat should slip when the seat is at a point intermediate its fully raised and operating positions, the seat will slam down and could possibly cause injury to the person.

SUMMARY OF THE INVENTION

According to the present invention there is provided an improved mechanism for supporting a seat in a raised, non-use position.

An object of the invention is to provide a seat holdup mechanism which is substantially located entirely beneath a platform to which a seat is mounted.

Another object is to provide a seat holdup having the capability of automatically catching a seat falling from a raised, non-use position.

Yet, a more specific object is to provide a seat holdup mechanism including a bracket secured to the underside of a seat platform and defining a fore-and-aft extending guide slot and to dispose an end of a prop link or rod in the slot for reception in one of a series of recesses formed by the guide slot and to bias the link for normally engaging the series of recesses.

A further object is to provide a release mechanism for selectively disengaging a prop link or rod from a recess formed by a link guide slot defined in a bracket secured to the underside of a seat platform.

These and other objects, features and advantages of the present invention will become apparent to those skilled in the art from the description which follows and from the drawings.

DESCRIPTION OF THE PREFERRED EMBODIMENT

Figure 1:
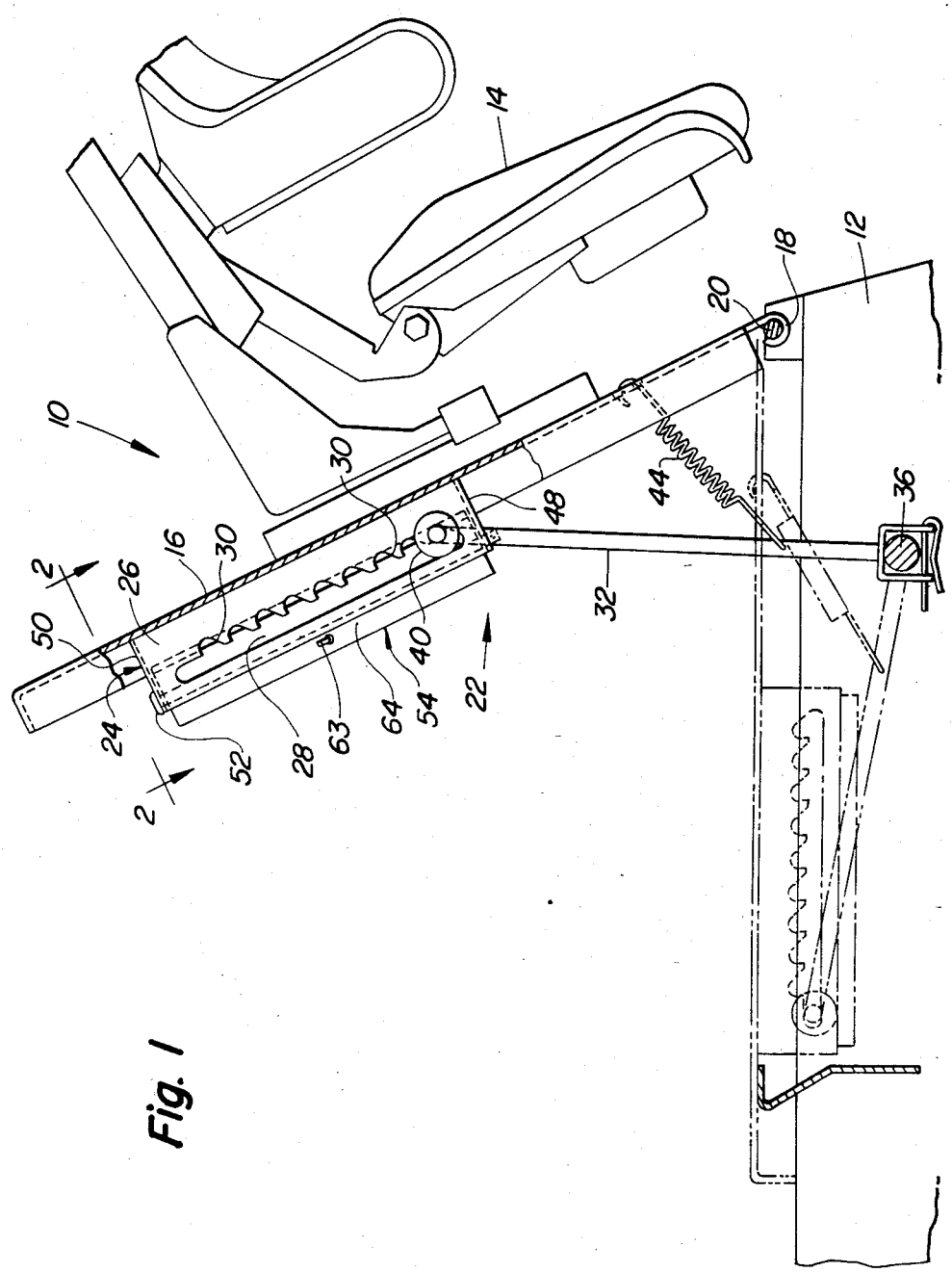
FIG. 1 is a right side elevational view of a seat assembly embodying a holdup mechanism constructed in accordance with the principles of the present invention and showing the seat structure in solid lines in a raised, non-use position and showing the holdup mechanism in dashed lines in a condition corresponding to a lowered, operative position of the seat.

Referring now to FIG. 1, therein is shown a vehicle seat structure 10 mounted to a vehicle frame 12 for vertical pivotal movement between a lowered operative position and a raised, non-use position.

Specifically, the seat structure 10 includes a contoured seat 14 mounted to a substantially rectangular platform 16 having a forward transverse edge portion formed to define a transverse tube section 18. A pivot shaft 20 is mounted to the frame 12 and thus defines a horizontal transverse axis about which the seat structure is tiltable upwardly and forwardly from a working position wherein the platform 16 is generally horizontal to a fully raised, non-use position wherein the platform is located at an angle of approximately 65 degrees to the horizontal. When in its lowered position, the platform 16 would normally cover various vehicle components which may from time-to-time require servicing, repair or replacement.

The seat structure 10 includes a holdup mechanism 22 for selectively holding the platform 16 in its raised position. The mechanism 22 includes an elongate bracket 24 mounted to the underside of the platform 16. The bracket 24 has a fore-and-aft extending flange 26 disposed perpendicular to and having a guide slot 28 provided therein in general parallelism to the platform surface to which the bracket is fixed. The guide slot 28 has an upper edge shaped to define a plurality of downwardly and forwardly opening notches 30. A prop link 32 is defined by a rod having a first end coupled to a horizontal transverse pivot shaft 36 pivotally mounted to the frame 12 at a location spaced rearwardly and downwardly from the shaft 20. The link 32 includes a straight central portion which is perpendicular to the shaft 36 and terminates in a transversely bent end 38 that is received in the guide slot 28. A washer 40 is held on the bent end 38 by a cotter pin 42 and keeps the end from moving sideways from the slot 28. A coil tension spring 44 is coupled between the platform 16 and the prop link 32 and serves to bias the prop link clockwise so as to urge the link end 38 toward engagement with an aligned notch 30. For example, when the platform 16 is in its fully raised position, as shown in solid lines in FIG. 1, the end 38 of the prop link 32 will be urged into engagement with the foremost of the notches 30.

Figure 2:
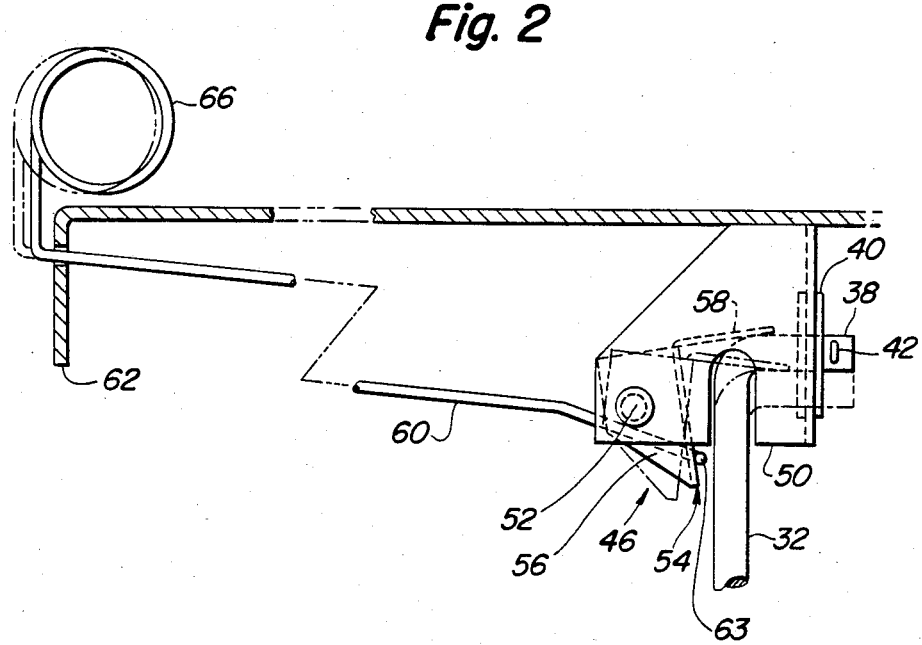
FIG. 2 is a sectional view taken along line 2—2 of FIG. 1 and showing the release mechanism.

The holdup mechanism 22 includes a release mechanism 46 for selectively disengaging the end 38 of the prop link 32 from an aligned one of the notches 30. Specifically, the bracket 24 includes opposite transverse ends 48 and 50 depending from the platform 16 and receiving a fore-and-aft extending pivot pin 52. A release plate 54 of L-shaped cross section extends between the bracket ends 48 and 50 and carries a pair of spaced tabs 56 which contain axially aligned openings in which the pivot pin 52 is received. The release plate 54 includes a leg 58 disposed in engagement with the prop link end 38 and oriented so as to rotate the prop link 32 against the action of the spring 44 and thereby remove the end 38 from an aligned one of the notches 30 when the release plate 54 is pivoted clockwise about the pin 52, as viewed in FIG. 2. A release rod 60 is reciprocably mounted in a depending side flange 62 of the platform 16 and has an end 63 hooked through a second leg 64 of the release plate 54. The release rod has a free end located outside of the platform and coiled to form a fingerhold 66. By pulling on the release rod 60, the release plate 54 is rotated to disengage the prop link end 38 from an associated notch 30.

The operation of the holdup mechanism 22 is briefly as follows. The seat platform 16 may be raised to the non-use position drawn in FIG. 1, by merely grasping and lifting the rear edge of the platform. The prop link end 38 will slide along the guide slot 28 and slide over the notches 30 during lifting due to their forwardly opening orientation. Once the end of the slot 28 is reached, the seat platform 16 is lowered slightly. The prop link end 38 will then automatically enter the foremost one of the notches 30 due to the action of the spring 44.

The seat platform 16 may then be moved to its lowered position by once again grasping and lifting the rearward end of the platform while at the same time pulling on the release rod 60 so as to effect clockwise rotation of the release plate 54 and corresponding counterclockwise rotation of the prop link 32 against the action of the spring 44, as viewed in FIG. 1. The seat platform 16 then may be lowered. Should the operator accidentally lose his grasp on the platform while lowering it, the platform 16 may be kept from slamming down by letting go of the rod 60 whereupon the spring 44 will act to engage the prop link end 38 with the adjacent notch 30. Thus, it will be appreciated that the holdup mechanism 22 provides a margin of safety for preventing an operator from being injured by a falling seat platform.

It will also be appreciated, that the holdup mechanism 22 occupies very little space and is located entirely beneath the platform when the platform 16 is in its operating position.

I claim:

1. In a vehicle seat assembly including a support frame; a seat platform pivotally mounted to the support frame for movement about a transverse axis between a lowered operative position and a raised inoperative position and a seat holdup mechanism including a prop link extending between the support frame and seat platform for selectively holding the seat platform in its raised inoperative position, an improved seat holdup mechanism comprising: said prop link being mounted to said frame for vertical swinging movement about a second axis paralleling said first axis and having a transversely bent free end; a latch bracket secured to a bottom surface of said platform and including a depending elongate flange extending in crosswise relationship to said first axis; said flange having a guide slot provided therein and having an upper edge shaped to define a plurality of notches; said transversely bent end being received in said guide slot; biasing means normally urging said link end against said upper edge of said guide slot; said notches being shaped to permit the seat platform to be raised without interference by said link but for receiving said end upon release of the seat platform when it is in a lifted position; operator means mounted for selectively engaging and pushing said link end away from said upper edge to thereby release the prop link and permit the seat platform to be lowered; and said operator means comprising an angle plate extending parallel to said guide slot and having a leg engaged with said link end; said angle plate being mounted to the platform for pivoting about a third axis paralleling said guide slot; and a release rod being connected to the angle plate and being selectively operable for pivoting the plate against the link end for pushing the latter away from the upper edge of the guide slot.

2. The vehicle seat assembly defined in claim 1 wherein said bracket has opposite depending ends extending crosswise to said flange and said angle plate being located between and pivotally coupled to said depending ends of the bracket.

3. The vehicle seat assembly defined in claim 1 wherein said seat platform has a depending flange extending along one side thereof; and said release rod being reciprocably mounted in said depending flange of the platform.

* * * * *